United States Patent [19]
Rowland-Hill

[11] 3,971,195
[45] July 27, 1976

[54] INFEED CONTROL FOR COMBINE ELEVATOR

[75] Inventor: Edward W. Rowland-Hill, Lancaster, Pa.

[73] Assignee: Sperry Rand Corporation, New Holland, Pa.

[22] Filed: Mar. 14, 1975

[21] Appl. No.: 558,506

[52] U.S. Cl............................ 56/14.6; 56/123; 130/27 T
[51] Int. Cl.² ........................................ A01D 45/02
[58] Field of Search............ 56/14.5, 14.6, 122–125; 130/27 R, 27 T

[56] References Cited
UNITED STATES PATENTS

| | | | |
|---|---|---|---|
| 2,262,906 | 11/1941 | Raney et al. | 56/125 |
| 3,333,405 | 8/1967 | Bulin | 56/14.6 |
| 3,645,074 | 2/1972 | Rettig | 56/14.6 |
| 3,742,686 | 7/1973 | Rowland-Hill | 56/12.9 |

Primary Examiner—Russell R. Kinsey
Attorney, Agent, or Firm—C. Hercus Just; Frank A. Seemar; John R. Flanagan

[57] ABSTRACT

Control means for the feeding of crop material from a header and condensing auger to the forward, inlet end of an upwardly and rearwardly extending elevator having an endless flight therein, said control means comprising plates connected to the inlet end of said elevator to restrict the width thereof and thereby prevent crop material from being engaged by the outer edges of said endless flight in said elevator, thereby preventing the accumulation and backfeeding of crop material along opposite side edges of said elevator.

2 Claims, 5 Drawing Figures

INFEED CONTROL FOR COMBINE ELEVATOR

CROSS REFERENCE TO RELATED APPLICATIONS

This application is one of a limited series of applications filed on even date herewith and respectively pertaining to different improvement inventions applicable generally to an axial flow combine or the like, the inventions covered by said series thereof being assigned to the same assignee as the instant invention.

BACKGROUND OF THE INVENTION

Combines for harvesting grain crops and the like generally include a header of very substantial width, such as of the order of about twenty feet or more, said header including cutting mechanism to separate the grain crop from the lower rooted portions thereof, the cut crop material then being converged toward the center of the header by rotatable auger means having opposite end portions spiralling in reverse directions to each other, the converged crop material then being delivered to the lower, inlet end of an elevator comprising an endless flexible flight, such as transversely extending bars mounted upon a series of endless chains or belts, for movement within an enclosing housing or casing which extends rearwardly and upwardly from the inlet end thereof and to elevate the crop material for discharge to feeding augers adjacent the inlet ends of threshing and separating rotors in the combine.

Particularly when harvesting short green damp crop material or short dry crop material having low structural strength, it has been found that backfeeding of the crop material to the header occurs over the top beater profile when a beater feeder type header is associated with a combine and, when a conventional elevator flight is employed with the combine, in which endless chains and transverse slats comprise the elevating flight means, backfeeding of the crop material under the upper sides of the elevator housing or casing occurs. This problem has been a source of difficulty in harvesting crops of the aforementioned types by a combine for substantial periods of time and although various attempts have been made to obviate the difficulty, none of these have solved the problem of backfeeding to the degree which has been made possible by the present invention.

The backfeeding problem can be caused, for example, by material accumulating in the dead spaces adjacent opposite sides of the housing of the elevator and is retained therealong on the feed ramp comprising the bottom wall of the elevator housing. The material accumulating in said dead spaces at the upper end of the elevator housing cannot be reached by the radial path of the feeding augers of the threshing and sepatating rotors.

SUMMARY OF THE INVENTION

It is the principal object of the present invention to provide the elevator of a combine with infeed control comprising means to restrict especially the width of the inlet opening through which the crop material passes from the converging auger of the header to the elevator flight means, whereby the width of the opening is less than the width of the flight means of the elevator and as a result of this, the crop material delivered to the flight means tends to travel upward along the bottom plate of the elevator housing in the form of a stream which does not extend beyond the opposite edges of the flight means and therefor no appreciable portion of the stream of material falls from the opposite edges of the flight means into the dead spaces adjacent opposite sides of the elevator housing.

It is still another object of the invention to restrict the stream of crop material traveling upwardly along the elevator bottom plate to a width substantially less than the combined widths of the effective working areas of the feeding augers on the threshing and separating rotors.

It is another object of the invention to restrict the width of the inlet opening at the lower end of the combine elevator by attaching similar plate members to the lower end of said elevator housing at opposite sides of the inlet opening thereof, one edge of each plate being at least immediately adjacent the opposite side edges of said opening and the opposite edges thereof extending toward each other to decrease the width of said inlet opening to such extend that it is at least less than the width of said endless flight means of said elevator and substantially less than the combined widths of the effective working areas of the feeding augers on the threshing and separating rotors.

It is a further object of the invention to provide said plate members with a vertical dimension greater than the height of said inlet opening, whereby the upper ends of said plate members are connectable by bolt means or the like to the front wall of the housing of the elevator and bracket members respectively are connectable to said front wall of the elevator adjacent the lower edge thereof and portions of the bracket means extending a limited distance toward each other from the opposite edges of said inlet opening and thereby provide support means to which the lower ends of said plate members may be attached by bolts or the like.

Details of the foregoing objects and of the invention as well as other objects thereof are set forth in the following specification and illustrated in the drawings comprising a part thereof.

DETAILED DESCRIPTION OF THE DRAWINGS

DETAILED DESCRIPTION

Figure 1:
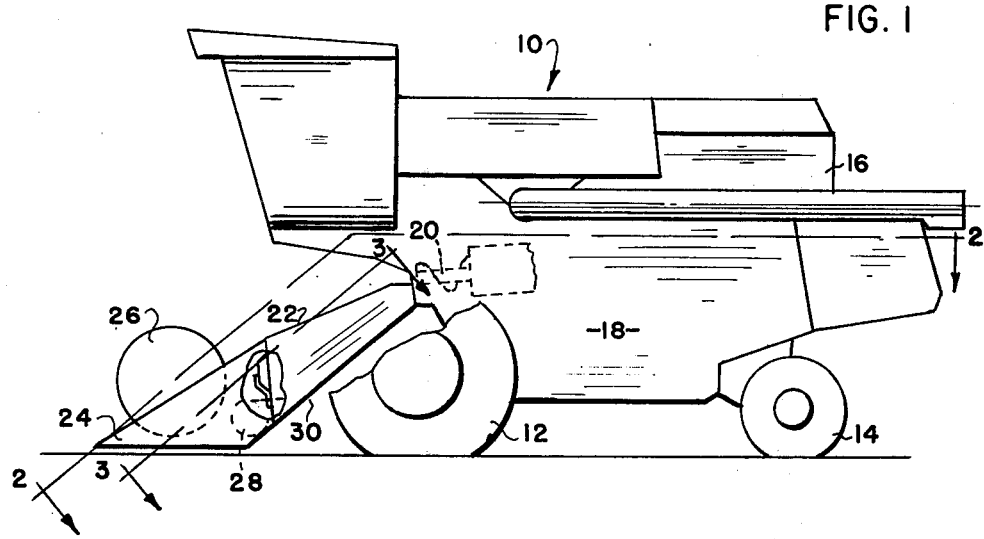
FIG. 1 is a side elevation of an exemplary combine of the type to which the present invention pertains, portions of the combine being cut away to expose interior details thereof.

Referring to FIG. 1, it will be seen that an axial flow combine is shown in side elevation in which the combine 10 is the mobile type and is provided with drive wheels 12 at opposite sides thereof, and rear wheels 14. Power means comprising an internal combustion engine of substantial horsepower rating is contained within the engine compartment 16. Said power means drives the threshing and separating mechainsm contained within the housing 18, said mechanism including auger means 20 which are illustrated somewhat diagrammatically in the broken-away portion of FIG. 1 and also being illustrated in FIG. 2 adjacent the upper end of an upwardly and rearwardly inclined elevator 22.

Figure 2:
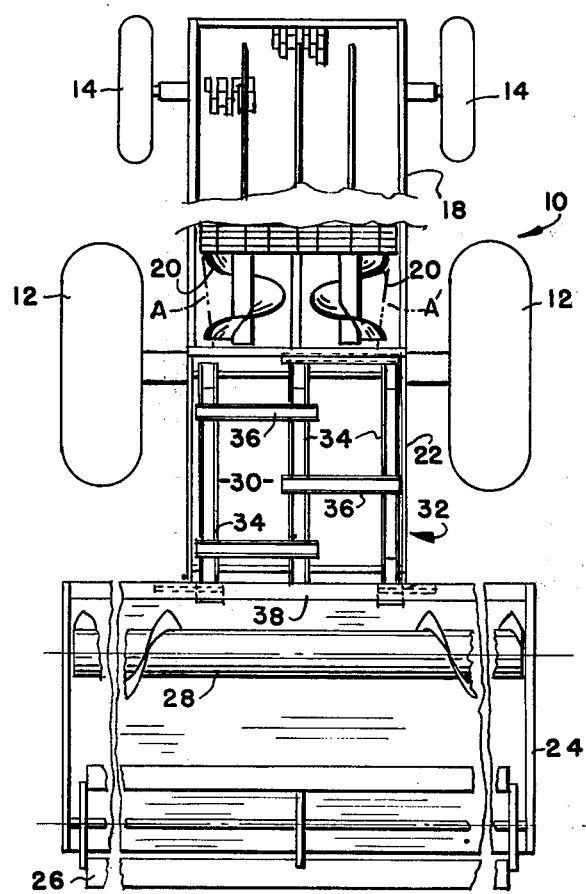
FIG. 2 is a sectional plan view of the lower portion of the combine illustrated in FIG. 1, substantially as shown on the line 2—2 thereof and the header of said combine is foreshortened to adapt the same to being illustrated on the sheet.

The elevator 22 comprises a housing which extends upwardly and rearwardly from a header 24 which is forwardmost in the combine 10 and, depending upon whether the combine is arranged to harvest grain crops such as wheat, oats, barley and the like, the header includes crop cutting means, a reel 26 and a converging auger 28 which, in FIG. 2, together with the header 24, is shown in transversely foreshortened manner, it being understood that said header may be of the order of 20 feet or more in width, whereby the combine is capable of harvesting a swath of crop material which is of substantial width and thereby render such harvesting efficient and time conserving while employing a minimum of labor.

The casing or housing of the elevator 22 includes a bottom plate 30, best shown in FIG. 1, which extends rearwardly and upwardly from the discharge end of the header 24 to the augers 20 of the threshing and separating mechanism within the housing 18. Said bottom plate 30 also is shown in FIG. 2 disposed beneath the flight means 32 shown in FIG. 2, which is enclosed within the casing of the elevator 22. Said flight comprises endless flexible members 34 between pairs of which transverse pushing bars 36 extend for purposes of the lower span of said flight means aggressively engaging crop material fed by the converging auger 28 to the transversely extending inlet opening 38 in the lower, forward end of the elevator casing, said opening 38 being illustrated in vertical elevation in FIG. 5. In said figure, the lower forward end of the flight means 32 is shown through elevator inlet opening 38 which extends between the opposite sides 40 of the casing of elevator 22 and the lower forward end of said elevator 22 includes a substantially vertical wall member 42, the lower edge 44 of which defines the upper edge of the inlet opening 38.

Figure 5:
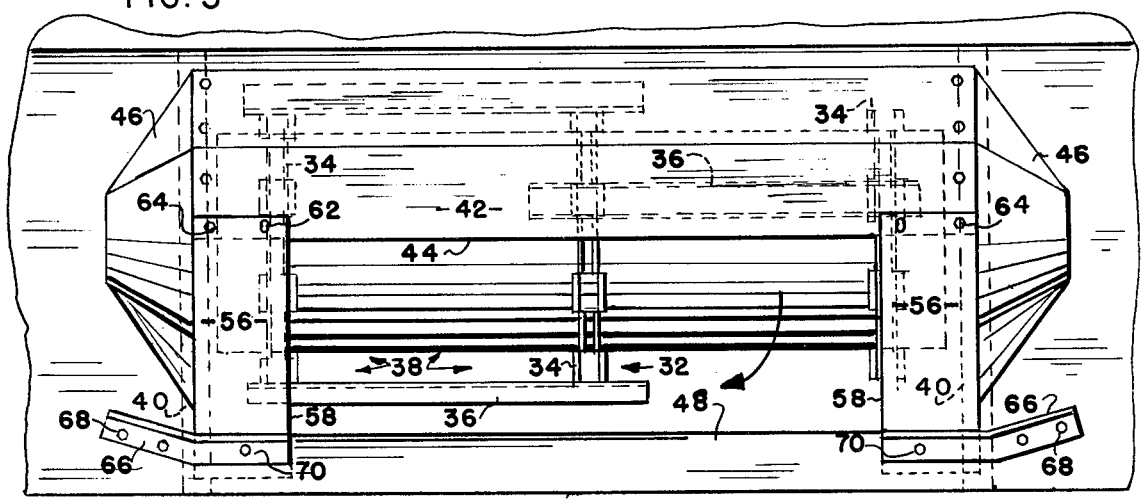
FIG. 5 is a fragmentary, enlarged vertical end view of the inlet end of the elevator shown in FIG. 4 as seen on the line 5—5 thereof.

In the specific illustration shown in FIG. 5, the opposite ends 46 of wall member 42 terminate in somewhat curved configuration and bulge outwardly to a certain extent but such arrangement is considered to be illustrative rather than restrictive. Also, the bottom plate 30 of elevator 22 terminates at its forward end 48 in a relatively narrow structural member to define the lower edge of the inlet opening 38.

Figure 3:
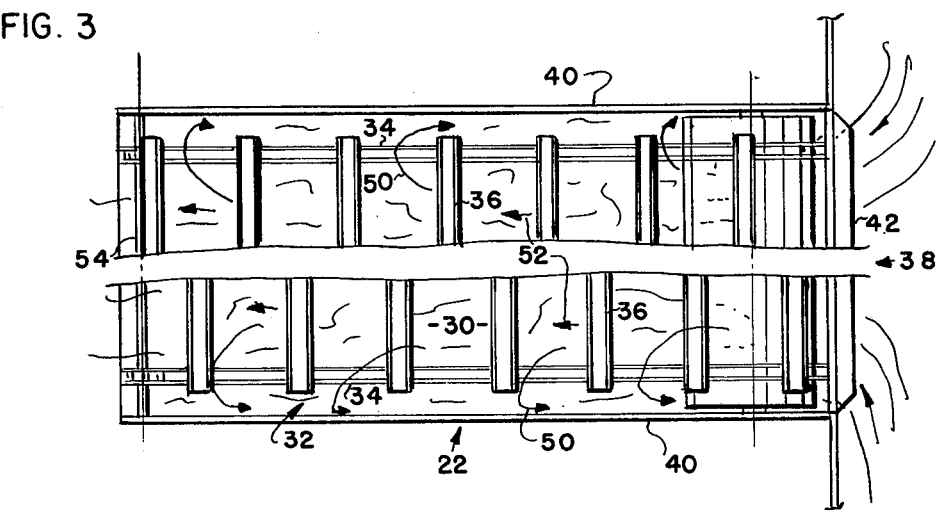
FIG. 3 is an enlarged, fragmentary sectional plan view of the elevator per se of the combine shown in FIGS. 1 and 2, substantially as seen along the line 3—3 thereof and illustrating the present prior art by directional arrows indicating backfeeding of crop material along opposite edges of the flight means of the elevator.

It has been found from the operation of a combine provided with a forward inlet opening 38 for the elevator 22 which extends substantially for the full width between the opposite sides 40 of the casing of the elevator that especially when for example short green damp crop material or short dry crop material having low structural strength is cut by the header 24 and condensed by the auger 28 and delivered to the inlet opening 38 of the elevator that backfeeding of the crop material occurs adjacent the opposite sides 40 of the elevator casing, somewhat as illustrated in exemplary manner by the U-shaped directional arrows 50 which are illustrated in FIG. 3 representing the prior art. This occurs due to the material dragging along the inner surfaces of the opposite sides 40 of the elevator casing and dropping from the mass of material otherwise being moved up the bottom plate 30 of the elevator 22 by the flight means 32 and especially the pusher bars 36 thereof. It will be understood that the outermost ends of the pushing bars 36 are spaced at least a limited distance from the inner surfaces of the opposite sides 40 of the elevator casing and the situation forms so-called dead spaces adjacent said sides 40 of the elevator casing.

Also, such backfeeding material may accumulate along the sides of the inlet into the feeding augers 20 of the threshing and separating unit outside of the combined effective working areas of the augers 20 which are between broken lines A, A' in FIG. 2. Such accumulation may eventually retard the flow of material from the elevator to the threshing and separating unit. As viewed in FIGS. 3 and 4 incidentally, it will be understood that the lower span of the flight means 32 is shown, the same moving in the direction of arrow 52 to indicate the direction of movement of said lower span of the flight means from the inlet opening 38 to the upper discharge end 54 of the elevator 22.

To obviate the occurance of such backfeeding as described hereinabove and as illustrated in FIG. 3, it has been found that the present invention affectively prevents any appreciable amount of such backfeeding due to restricting particularly the width of the inlet opening 38. This is conveniently accomplished by providing a pair of similar plate members 56 which have a length greater than the height of the inlet opening 38 as readily can be seen from FIG. 5. One edge of said plates is co-extentsive with the forward edge of the opposite sides 40 of the elevator casing and the opposite edge 58 of each plate extends toward the center of the inlet opening 38 a sufficient distance that an appreciably narrower inlet opening 38 is provided. Preferably, especially as viewed in FIG. 5, it will be seen that the edges 58 of said plate member extend laterally beyond the outer edges of the flight means 32 so as to obscure said outer edges and render the same incapable of engaging crop material moving through the inlet opening 38 for engagement by the flight means 32 as the material slides upwardly along the bottom plate 30 of elevator 22.

Figure 4:
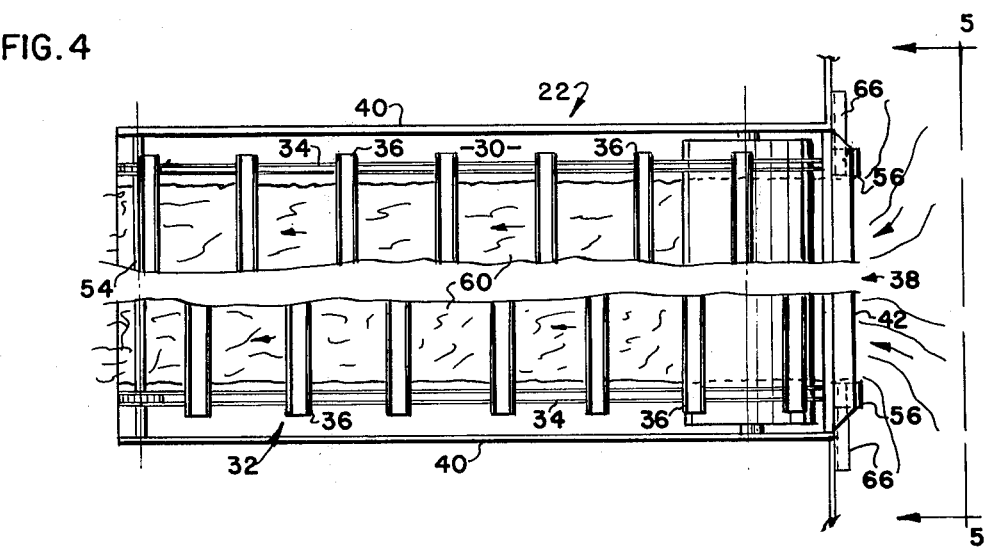
FIG. 4 is a view similar to FIG. 3 but illustrating the manner in which the present invention substantially prevents the occurrence of backfeeding of crop material being elevated by the elevator from the inlet opening thereof.

As a result of decreasing the size and especially the width of the inlet opening 38 at the lower, forward end of elevator 22, by referring to FIG. 4, it will be seen that the stream 60 of crop material which enters the inlet opening 38 will be of less width than the flight means 32 and substantially less than the combined widths of the effective working area of feeding augers 20 and, therefore, there is either minimal or no backfeeding of the material resulting from certain amounts of the material falling from the upwardly directed stream thereof and hence there is no accumulation of crop material within the aforementioned dead spaces occuring along the inner surfaces of the opposite sides 40 of the elevator casing. Even should a minimal amount of backfeeding of material still occur along the sides 40 of the elevator casing, it will be seen that the provision of plate members 56 prevent re-entry of such material into the header which otherwise might retard flow of material from the header to the elevator.

The plate members 56 readily are attached to the inlet end of the elevator 22. Referring to FIG. 5, it will be seen that the upper ends of said plates have a limited area which overlies the vertical wall member 42 and said overlying portion is provided with one or more holes 62 which receive appropriate securing means such as screws or bolts 64. The lower ends of the plate members 56 are connected to suitable brackets 66 which are connected at one end to the casing of elevator 22 by means of bolts which extend through holes 68. Said brackets also extend a limited distance into the inlet opening 38, said distance being no greater than the width of the plates 56 and the lower ends of said plates are secured to said projecting ends of brackets 68 by appropriate bolts 70. Said arrangement is ample and effective to restrict the width of the flow of crop material to and through the inlet opening 38 at the lower end of conveyor 22 in a manner to minimize or completely prevent backfeeding of the crop material such as previously occured when no such restriction of the inlet opening was present, as visually illustrated in exemplary manner in FIG. 3, while harvesting crops of a relatively short damp nature or a dry crop having low structural strength, or otherwise, such as described hereinabove.

Under circumstances where the combine is to be used to harvest other types of crops which do not result in the backfeeding difficulty illustrated in FIG. 3 for example, the opening-restricting plates 56 readily may be detached by first removing the header 24 and then removing bolts 64 as well as the bolts which extend through the holes 68 in brackets 66, thus separating the plates 56 from the forward end of the elevator and restoring the inlet opening 38 to its maximum width. It is preferred that the brackets 66 be removed under such circumstances rather than merely remove the bolts 70 while retaining the brackets connected to the forward end of the elevator, whereby the inner ends of the brackets 66 which extend slightly into the inlet opening 38 will offer no impedance to the passage of crop material into and through said inlet opening 38.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A combine of the axial flow type comprising crop material harvesting means mounted on the forward end of said combine and having discharge means operable to discharge cut crop material from the central part of said harvesting means, an elevator extending from said harvesting means upwardly and rearwardly thereform, axially arranged threshing and separating mechanism adjacent the upper end of said elevator and having an inlet end and including rotatable auger means extending longitudinally forward from said inlet end and receiving crop material to be threshed, said auger means having a working area centrally thereof and of less width than the width of said auger means, said elevator comprising endless flight means movable within a housing having a substantially vertical wall member provided with an inlet opening extending across said wall member at the lower end of said elevator, said opening being substantially as wide as said flight therein and the upper end of said housing having a discharge opening adjacent the inlet end of said threshing and separating mechanism; in combination with inlet restricting plates detachably connected to said wall member of said elevator housing and overlie the opposite sides of said inlet opening therein to restrict said opening to a width less than that of said flight and thereby permit only a mass of crop material of less width than said elevator flight to be carried by said elevator to said working area of said threshing and separating mechanism, thereby eliminating a tendency for crop material otherwise to become lodged outside of said working area or escape from opposite edges of said flight means of said elevator and accumulate within spaces at opposite sides of said elevator housing, and means detachably connecting the upper and lower ends of said vertical plates to said wall member of said elevator housing.

2. The combine according to claim 1 in which the upper ends of said plate members overlie said vertical wall member above the upper edge of said inlet opening therein and, said detachable connecting means comprising bolt means to secure said upper ends of said detachable plate members to said wall member and further including bracket members attached respectively to said wall member at opposite sides of said inlet opening adjacent the lower edge of said opening and extending at one end respectively into the opposite sides of said opening for attachment of the lower ends of said detachable plate members thereto, and securing means attaching said lower ends of said detachable plate members to said extending ends of said bracket members.

* * * * *